US011912503B1

(12) United States Patent
Parness et al.

(10) Patent No.: US 11,912,503 B1
(45) Date of Patent: Feb. 27, 2024

(54) INTERACTING WITH AND INSPECTING OF MOVABLE INVENTORY SYSTEMS (71) Applicant: Amazon Technologies, Inc., Seattle, WA (US)

(72) Inventors: Aaron Joseph Parness, Mercer Island, WA (US); Ennio Claretti, Seattle, WA (US); Emily Dunne, Seattle, WA (US); Parker Owan, Seattle, WA (US); Andrew Stubbs, Seattle, WA (US); Benjamin Bedard, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 763 days.

(21) Appl. No.: 17/037,068

(22) Filed: Sep. 29, 2020

(51) Int. Cl.
*G06F 7/00* (2006.01)
*B65G 1/137* (2006.01)
*B25J 13/08* (2006.01)
*B25J 9/04* (2006.01)
*B25J 9/16* (2006.01)

(52) U.S. Cl.
CPC ............ *B65G 1/1373* (2013.01); *B25J 9/042* (2013.01); *B25J 9/1669* (2013.01); *B25J 13/08* (2013.01)

(58) Field of Classification Search
CPC ....... B65G 1/1373; B25J 9/042; B25J 9/1669; B25J 13/08
USPC .......................................... 700/213–214, 216
See application file for complete search history.

(56) References Cited

U.S. PATENT DOCUMENTS 11,485,533 B1 * 11/2022 Hoffman ................. B65B 31/02
2015/0339872 A1 * 11/2015 de Puiseau .......... G06Q 10/083
340/5.5

* cited by examiner

*Primary Examiner* — Yolanda R Cumbess
(74) *Attorney, Agent, or Firm* — Eversheds Sutherland (US) LLP (57) ABSTRACT Embodiments herein describe a pick or stow system that uses a mechanical system to stow an item into a container, retrieve an item from the container, or both. In one embodiment, the mechanical system includes a gantry or a robotic arm that permits various sensors, tools, or end effectors to interact with a plurality of containers. For example, the plurality of containers may be supported by a rack where each container may have any number of types of items. The gantry or robotic arm can move the sensors, tools, or end effectors to a particular container to either stow an item into the container or pick an item from the container.

20 Claims, 8 Drawing Sheets

INTERACTING WITH AND INSPECTING OF MOVABLE INVENTORY SYSTEMS

BACKGROUND

The present invention relates to a mechanical system for stowing or picking items from a plurality of containers on a rack.

Smaller items in a warehouse are typically stowed in containers and then retrieved at a later time to fulfill a customer's order. Instead of stowing all the same items in the same containers, the items may be stowed randomly such that the containers may contain many different types of items that have many different sizes. Further, the items may be arranged differently in each container. Because of the wide variety of items being stowed and retrieved, it is difficult to design a mechanical system that can reliable stow an item into a container that may already have many different types of items and retrieve an item from a densely packed container.

DETAILED DESCRIPTION

Embodiments herein describe a pick or stow system that uses a mechanical system to stow an item into a container, pick an item from the container, or both. In one embodiment, the mechanical system includes a gantry or a robotic arm that permits various sensors, tools, or end effectors to interact with a plurality of containers. For example, the plurality of containers may be supported by a rack where each container may have any number of items. The gantry or robotic arm can move the sensors, tools, or end effectors to a particular container to either stow an item into the container or pick an item from the container.

The mechanical system may include a perception sensor for identifying occupied or unoccupied space in the containers, identifying an arrangement of items in the containers, the types of items, and the like. With this information, the mechanical system can identify a location to stow an item, or identify an item to pick. In some embodiments, the containers include retaining elements—e.g., an elastic band or flap—that secures the items in the containers. The mechanical system can include an access tool for displacing (or opening) the retaining element so that a grabber tool can stow or pick the item.

In one embodiment, the mechanical system includes a spacer tool for creating space to stow an item in a densely packed container. The spacer tool can displace or shift the currently stowed items in the container so that the grabber tool can place another item into the container. For instance, the access tool may include a flat shaped end effector that is inserted into the container which pushes the items to one side of the container, thereby creating space for a new item to be stowed in the container. In another embodiment, the spacer tool includes two faceplates that are inserted between two items in the container. Spreading the faceplates creates a space where a new item can be inserted between the faceplates.

Figure 1:
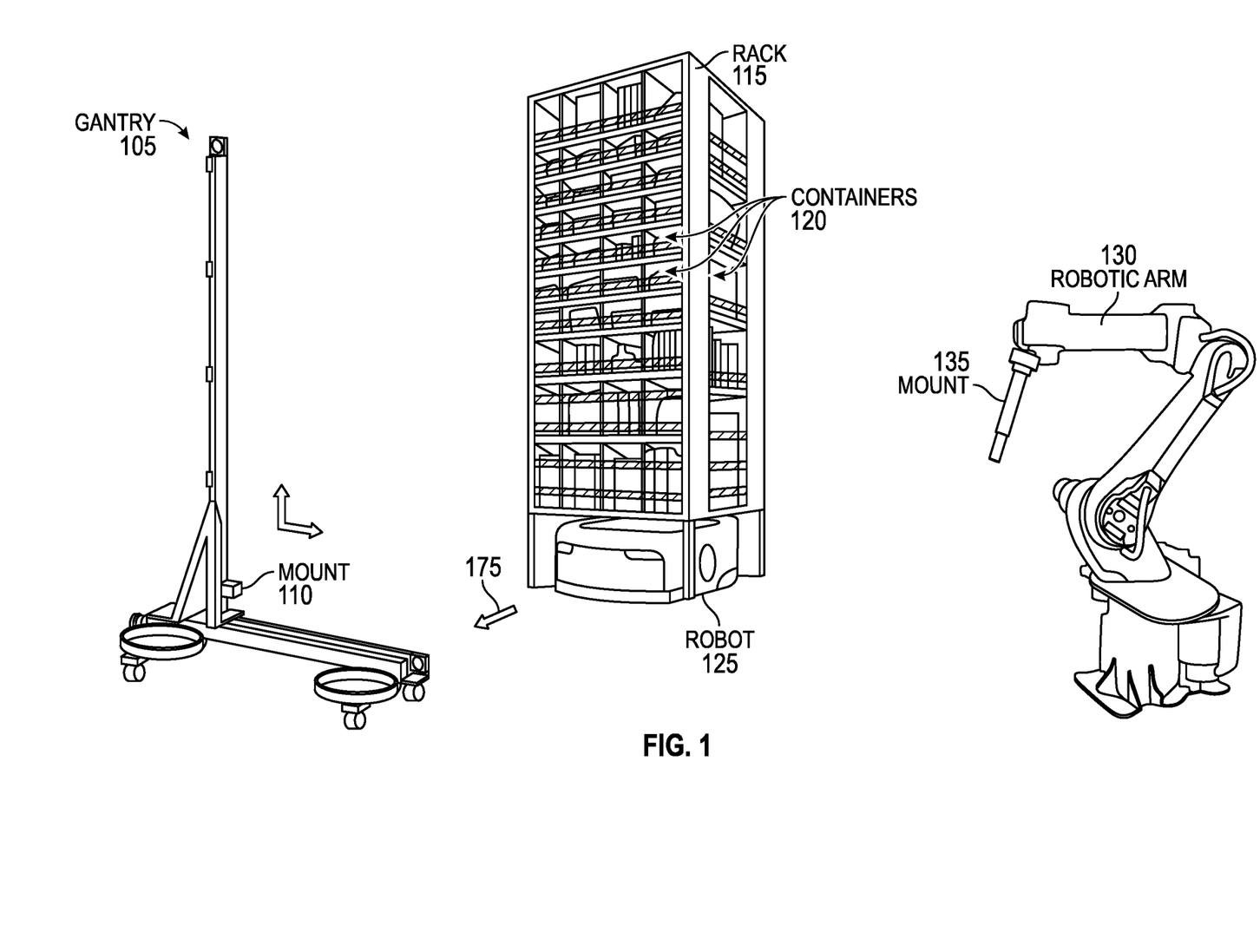
FIG. 1 illustrates a stow or pick system, according to one embodiment.

FIG. 1 illustrates a stow or pick system 100, according to one embodiment. The system 100 includes a gantry 105 that includes a mount 110 on which varies various sensors, tools, and end effecters can be disposed. In this embodiment, the gantry 105 provides two-axis motion (e.g., vertical and horizontal) so that the mount 110 can be moved to any location within a 2D plane established by the horizontal and vertical sides of the gantry 105. That is, a bottom, horizontal side of the gantry 105 can move the vertical side of the gantry 105 in the horizontal direction, thereby changing the horizontal displacement of the mount 110 (which is attached to the vertical side). In parallel, the vertical side can move the mount 110 up and down. In this manner, the gantry 105 can move the mount 110 (and the various elements supported by the mount) in a 2D area.

The system 100 includes a rack 115 that includes a plurality of containers 120. Further, the system 100 includes a robot 125 that can pick up and move the rack to a location in front of the gantry 105 as shown by the arrow 175. The dimensions of the rack 115 and the gantry 105 may match so that the gantry 105 can move the mount 110 to be disposed in front of any of the containers 120. Stated differently, the height and width of the sides of the gantry 105 may be equal to or greater than the dimensions of the rack 115 so that the gantry 105 can move the mount 110 to access any of the containers 120. Further, the rack 115 can have containers on multiple sides which can be accessed by the robot 125 spinning the rack 115 so that each side of the rack 115 can face the gantry 105.

In the embodiment in FIG. 1, the gantry 105 remains stationary while the robot 125 brings the rack 115 to the location of the gantry 105 (which may be disposed in a pick or stow station). After the gantry 105 performs a pick or stow operation, the robot 125 can move the rack 115 away from the gantry 105 and another robot can move a different rack to the gantry 105 so that the gantry 105 can perform another pick or stow operation. However, in another embodiment, the gantry 105 may be moveable. In that example, the gantry 105 may include wheels and a power system for moving it to the rack 115 (which may be stationary). The gantry 105 may, for example, pick an item, put it on a storage container on the gantry (not shown), and them then move to a different rack to pick a different item. Thus, the embodiments herein are not limited to the pick/stow arrangement shown in FIG. 1.

The stow/pick system 100 also includes a robotic arm 130 which may be used in place of the gantry 105 to pick or stow an item from the containers 120 in the rack 115. That is, FIG. 1 illustrates two alternative mechanical systems that can be used to pick or stow items from the containers 120: the gantry 105 and the robotic arm 130. For example, the robot 125 can move the rack 115 to a position proximate to the robotic arm 130 which can maneuver a mount 135 containing sensors, tools, or end effectors in front of a selected container in order to perform a pick or stow operation. Alternatively, the robotic arm 130 may be mobile and the racks 115 can be stationary in which case the robotic arm 130 may move between the racks to perform pick and stow operations. In this manner, FIG. 1 illustrates two different mechanical systems including respective mounts 110, 135 for supporting various sensors, tools, and end effecters for stowing and/or picking items from the containers 120. Further, the embodiments herein could use other mechanical systems besides the gantry 105 and the robotic arm 130, such as a hanging pulley/crane system or a gantry that has a static frame defining the 2D area in which a mount 110 can move.

Figure 2:
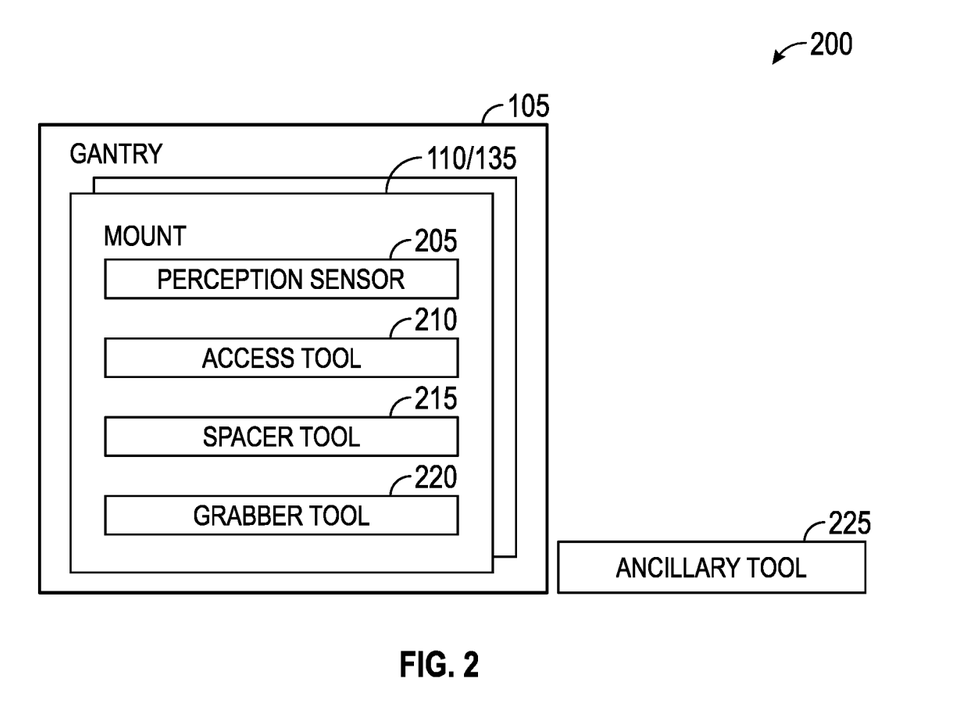
FIG. 2 is a block diagram of a mount containing sensors and tools for stowing or picking an item, according to one embodiment.

FIG. 2 is a block diagram of the mount 110, 135 containing sensors and tools for stowing or picking an item in a mechanical system 200, according to one embodiment. That is, FIG. 2 illustrates the various components that may be supported by either the mount 110 or the mount 135 illustrated in FIG. 1. Further, the gantry 105 can include multiple mounts 110. That is, the gantry 105 may be designed so that two or more mounts 110 can be moved in the 2D region such that the gantry 105 can perform multiple picks or stows in parallel (e.g., while one mount performs a pick operation in a first container, another mount performs a stow operation in a different container). Further, while FIG. 2 illustrates the mounts being attached to a gantry 105, the description below applies equally to a mount attached to a robotic arm.

In this example, each mount 110, 135 includes one or more perception sensors 205. The perception sensor may be a visual sensor, depth sensor, infrared sensor, barcode reader, tactile sensor, or combinations thereof. The perception sensor 205 can be any sensor that permits the stow/pick system to identify occupied versus empty space in the container, identify the arrangement of items in the container, identify the type or number of items in the container, identify the individual items in the container, and the like. If the mount 110, 135 includes multiple perception sensors, they may be disposed at different angles. To provide different views of the insides of the container.

While FIG. 2 illustrates coupling the perception sensor 205 to the mount 110, 135, the sensor 205 can instead be mounted external to the gantry 105. For example, the pick or stow station containing the gantry 105 may include several stationary perception sensors 205 for viewing into multiple containers (e.g., one perception sensor for viewing the top half of the containers in the rack and another perception sensor for viewing the bottom half of the containers). In another embodiment, the perception sensors may be mounted on the rack itself. Thus, the perception sensor 205 can be attached to the mount 110, 135 or be external to mount 110, 135 and the gantry 105 (or robotic arm). If the perception sensor 205 is a tactile sensor, it may be inserted into the container in order to provide data about the contents in the container.

The mount 110, 135 also includes an access tool 210 for displacing a retaining element that secures items in the containers. As discussed in more detail below, a retaining element may be disposed at a front face of the containers which the mechanical system 200 can use the access tool to move or open so that an item can be stowed in the container, or picked from the container. After the action is performed, the access tool can release or reengage the retaining element so that the items remaining in the container are less likely to fall out of the container. Of course, if the containers do not have retaining elements, than the access tool 210 may be omitted.

A spacer tool 215 can be used to create space for stowing an item into the container. For example, if analyzing the data captured by the perception sensor 205 indicates the container is already densely packed (e.g., there is little empty space), the mechanical system can use the spacer tool 215 to create space in the container. In one embodiment, the spacer tool 215 may shift items to one side of the container, or can create space between two items in the container. Additional details of the spacer tool 215 are provided in FIGS. 8-9 below.

A grabber tool 220 can be used to pick an item from the container or stow an item in the container. The grabber tool 220 can include a claw, fingers, suction cups, or other types of end effecters for carrying an item. In one embodiment, the grabber tool 220 can include one type of end effecter, or can include different types of end effecters. For example, the grabber tool 220 may use a different type of end effecter depending on the type of item (e.g., a bubble-wrapped package versus a rigid box). The grabber tool 220 may include a telescoping element so it can be moved in and out of the container. In one embodiment, the grabber tool 220 may be a robotic arm attached to the mount 110, 135 so that the grabber tool 220 can have additional degrees of freedom when stowing or picking items.

In addition to the sensors, tools, and end effecters attached to the mount 110, 135, the mechanical system 200 can include an ancillary tool 225 that supports the operations performed by the mount 110, 135. For example, one of the sensors 205 or the tools on the mount 110, 135 may instead be attached to the ancillary tool 225. For example, the grabber tool 220 may be the ancillary tool 225 rather than being attached to the mount 110, 135. Or the ancillary tool 225 may have additional environmental sensors. In any case, the ancillary tool 225 may be mounted on a different movement system (e.g., a separate robotic arm or gantry). Alternatively, the tool 225 may be stationary. The ancillary tool 225 can work in tandem with the sensors and tools on the mount 110, 135 to pick or stow items in the containers.

In one embodiment, the ancillary tool 225 may be a conveyor belt that moves items to or from the gantry 105. For example, when doing a stow operation, the conveyor belt may bring the item to the mount 110 where it is loaded onto the grabber tool 220. The gantry 105 can then move the mount 110 to a selected container and stow the item. When doing a pick operation, after the grabber tool 220 retrieves the item from a container, the gantry 105 can move the mount 110 to an unloading zone, where the item is placed on the conveyor belt and moved to a different portion of the warehouse.

Figure 3:
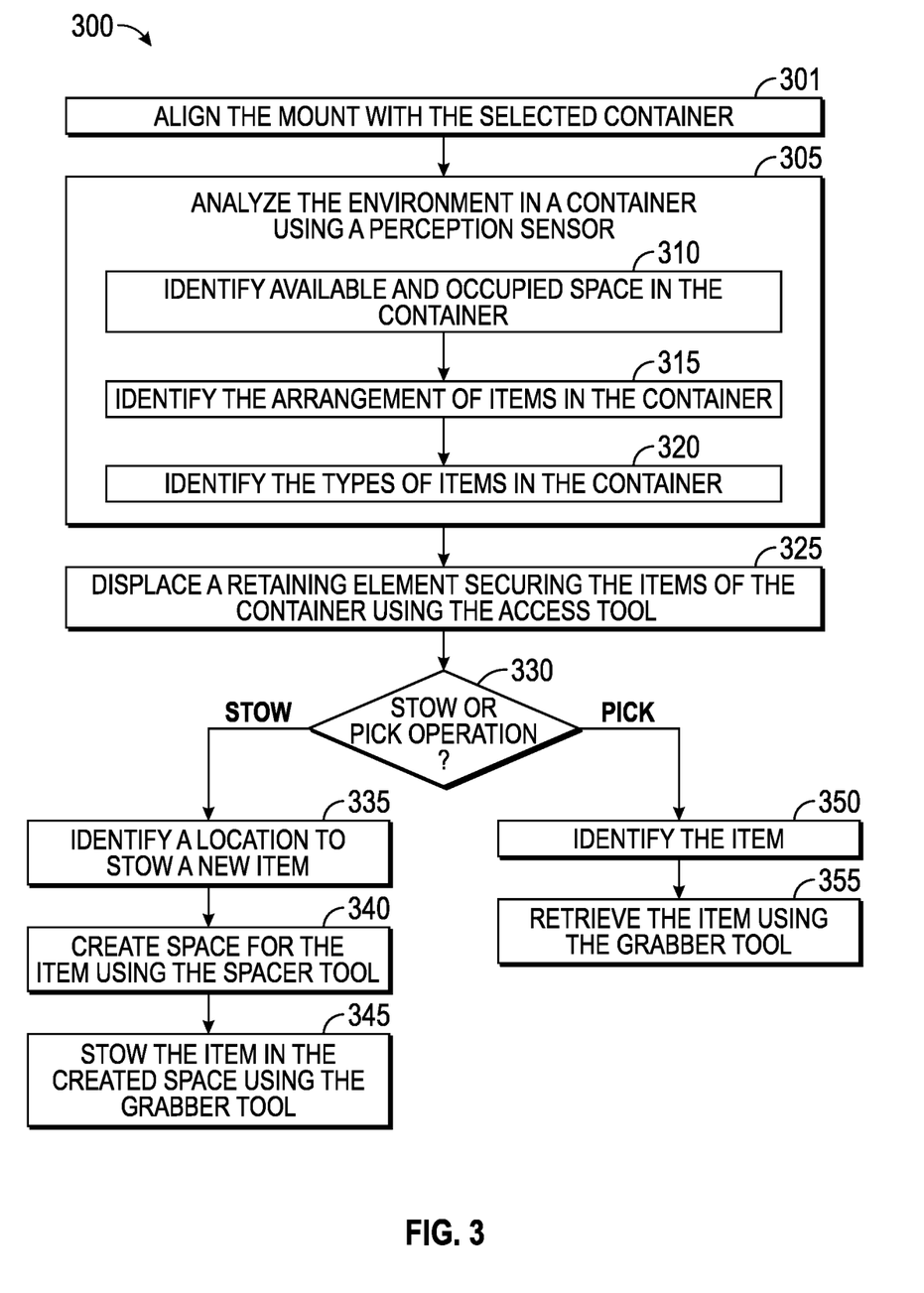
FIG. 3 is a flowchart for picking items from, and stowing items into, a container, according to one embodiment.

FIG. 3 is a flowchart of a method 300 for picking items from, and stowing items into, a container, according to one embodiment. At block 301, the gantry or robotic arm aligns the mount with the selected container. Doing so also aligns the sensors and tools on the mount (e.g., the perception sensor, access tool, spacer tool, or grabber tool) with the container so that these devices can interact with the container as described below.

At block 305, the pick/stow system analyzes the environment in a container using a perception sensor. This sensor may be attached to the mount on the gantry or robotic arm or may be attached on an external frame of a pick and stow station, or may be attached to the rack containing the plurality of containers. Further, the system may rely on a plurality of sensors that may be the same type (e.g., multiple cameras) or different types (e.g., a camera and a depth sensor).

In one embodiment, the sensor data captured by the perception sensor or sensors is analyzed by a computer processor and a software application. The software application may perform image processing to identify areas or items of interest in a captured image or depth map. The stow/pick system can then use this information to provide instructions and movement commands to the gantry, robotic arm, tools, and end effecters described herein to perform a pick or stow operation.

Block 305 includes three sub-steps that can optionally be performed. At block 310, the pick/stow system can use the data captured by the perception sensor to identify available and occupied space in the container. This information may be useful when choosing a location to stow an item. The system may consider the size and shape of the available space and the item to be stowed to determine a suitable location for the item.

At block 315, the system identifies the arrangement of items in the container. This information may be useful to determine where to stow an item, or how to potentially move the already stowed items in order to free up additional space for stowing a new item. For example, if the items (e.g., thin cases) are stacked horizontally, or some items are stacked vertically while others are stacked at an angle, the system may determine that a larger continuous space can be created by stacking all the items vertically. The system can use the spacer tool as described below to rearrange the items so that a space sufficient for stowing the new item is created.

At block 320, the system identifies the types of items in the container. Identifying the item type may help the system identify the item that should be retrieved during a pick operation. As mentioned above, the containers may have many different types of items rather than storing only one type of item. The pick/stow system can analyze the data captured by the perception sensor to identify the item that should be retrieved to, e.g., satisfy a customer order.

Moreover, identifying the type of item may help when stowing an item. If the container is densely packed, identifying that the container has compressible items (e.g., clothing, or a package with bubble wrap) may indicate that the items can be compressed in order to stow another item into the container. For example, if the system identifies two bubble-wrapped items next to each other, the system may decide to stow an item between those compressible items.

The block 305 can perform one, some, or all of sub-blocks 310-320 when analyzing the data generated by the perception sensor or sensors.

At block 325, the access tool displaces a retaining element securing the items of the container. As mentioned above, the retaining elements may be disposed at an opening of the containers to reduce the chance the items in the container fall out such as when the robot is moving the rack containing the containers. If the rack is jostled or accelerated, the items are less likely to fall from the containers. However, the retaining element may also block the grabber tool from stowing or picking an item. Thus, at block 325, the access tool can displace the retaining element by, e.g., grabbing, pushing, or opening the retaining element so that the retaining element no longer blocks the grabber tool. If the containers do not contain a retaining element, then block 325 may be omitted. On the other hand, if the containers do contain retaining elements, block 325 may be performed before block 305 so that the retaining element does not block the perception sensor from capturing an accurate view or image of the inside of the container.

At block 330, the method 300 branches depending on whether the system is performing a pick or stow operation. If performing a stow operation, the method 300 proceeds to block 335 where the stow/pick system identifies a location to stow a new item using the information the system learned at block 305. For example, the system may evaluate the available space in the container and determine whether there is a continuous space large enough to fit the item. That is, the system may already know the dimensions of the item and determine whether the item can be oriented in such a way to fit into the available space.

If no portion of the container has sufficient space, the system may evaluate whether the currently stowed items can be rearranged to provide sufficient space to fit the item. For example, if the currently stowed items are pushed to the one side, this may create a space on the other side sufficient for stowing the item. Alternatively, if the items are rearranged such as being stacked horizontally or vertically, this may create a space sufficient for the item. Further, the system may consider whether the item can be inserted by compressing the items already in the container such as stowing the item between two compressible items.

At block 335, assuming there is not already sufficient space for the item, the spacer tool creates a space sufficient for the item. In one embodiment, the spacer tool may have an end effecter like a spatula that can be inserted into the container and then moved in order to push items towards one of the sides. In another embodiment, the spacer tool may include an end effecter for grabbing and rearranging the items (e.g., stacking the items vertically or horizontally in the container rather than the items have different angles or orientation). In yet another embodiment, the space tool may use two faceplates to create space between two items so that the new item can be inserted between the items.

At block 340, the grabber tool stows the item in the created space. The grabber tool can have any type of end effecter for holding, moving, and releasing the item such as a claw, fingers, or one or more suction cups. In this manner, the method 300 can analyze the inside of a container, identify a location for the item, create space for the item at the location (if sufficient space does not exist), and stow the item at the location.

Returning to block 330, if the system is picking an item, the method 300 instead proceeds to block 350 where the system identifies the item using the information learned at block 305. That is, using image analysis, a barcode reader, or depth map, the system can identify the desired item from other, different types of items stowed in the same container.

Once the desired item is identified, at block 355, the grabber tool retrieves the item from the container. In this manner, the pick/stow system can pick and stow items. Further, while the method 300 illustrates a system that can perform both, in one embodiment, the system may be only a pick system, or only a stow system. Further, some of the blocks in the method 300 may be performed by an associate rather than a tool. For example, a mechanical system may perform blocks 305-325 while the associate stows the item into the container or retrieves the item from the container.

In one embodiment, the tools and sensors described in the method 300 are attached on the same mount, which may in turn be mounted on a gantry or robotic arm. In other embodiments, the tools and sensors may be attached to different mounts that are part of different moveable or fixed platforms. For example, the perception sensor, access tool, and spacer tool may be on the same mount while the grabber tool is attached to a different mount or movement system. Or the access tool, spacer tool, and grabber tool may be on the same mount while the perception sensor is disposed on a rigid frame or a different moveable system.

Figure 4:
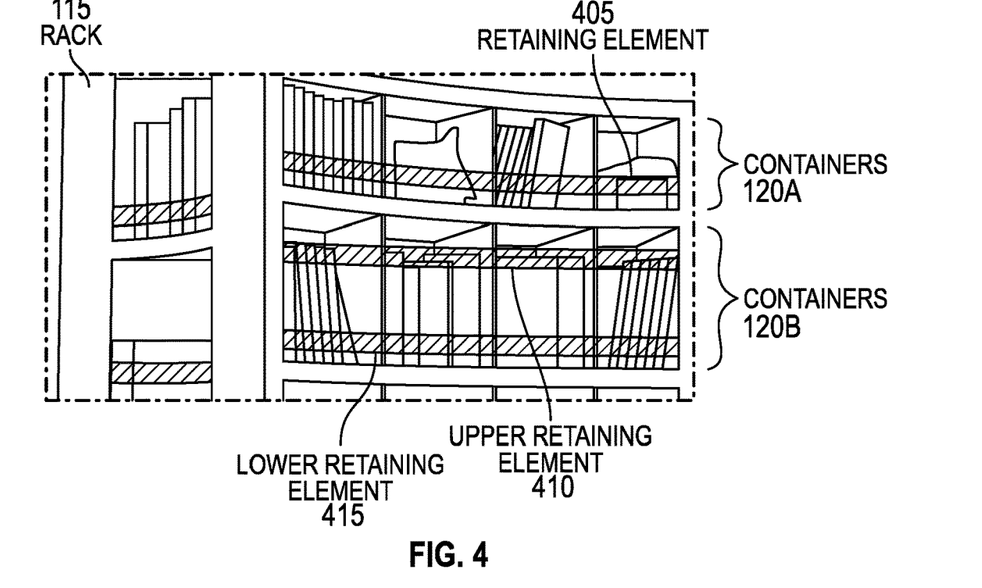
FIG. 4 illustrates containers with items being secured by retaining elements, according to one embodiment.

FIG. 4 illustrates containers 120A and 120B with items being secured by retaining elements 405, 410, and 415, according to one embodiment. As shown, FIG. 4 illustrates a portion of a rack that has two rows of containers. The upper row of containers 120A contain a retaining element 405 disposed at the lower half of the open face of the containers 120A. In this example, the retaining element 405 is an elastic material that secures the items into the container. If the rack 115 is jostled or accelerated, an item that falls toward the open face of the container is held in the container by the retaining element 405. While the retaining element 405 is elastic, the element 405 has sufficient rigidity to prevent lighter items from falling out of the container but has sufficient elasticity so that an associate or access tool can display the retaining element 405 to pick or stow an item.

The lower row of containers 120B have two retaining elements 410, 415 disposed at their open face. That is, the retaining element 410 is disposed in the lower half of the open face while the retaining element 415 is disposed in the upper half of the open face. Having two retaining elements may be preferred when the items stowed in the containers 120B may be taller or heavier than the items stowed in the containers 120A.

While FIG. 4 illustrates elastic bands as the retaining elements, in other embodiments, the retaining elements can be a flap that is hinged at the top of the containers, or a gate that swings open and has a magnetic or mechanical clasp to hold the gate closed. Thus, the embodiments herein are not limited to the flexible bands illustrated in FIG. 4 or in the discussion that follows. If a different type of retaining element is used, the access tool may be changed accordingly in order to displace the retaining element so that a grabber tool (or associate) can access the container.

Figure 5:
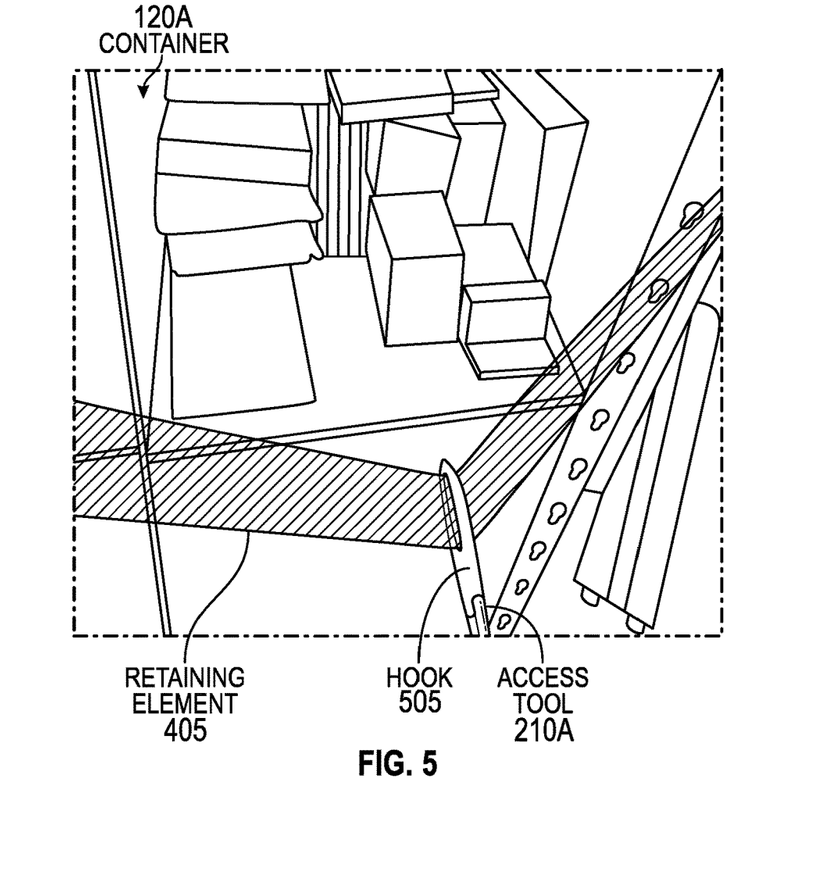
FIG. 5 illustrates an access tool for displacing a retaining element to provide access to a container, according to one embodiment.

FIG. 5 illustrates an access tool 210A for displacing a retaining element to provide access to a container, according to one embodiment. In this example, the access tool 210A has a hook 505 or a clasp for grabbing the retaining element 405. The access tool 210A can then pull the hook 505 downward so that the retaining element 405 no longer covers the open face of the container 120A. That way, a grabber tool now has more room to maneuver when performing a stow or pick operation. In another embodiment, the access tool 210A may use forceps to grab the elastic retaining element 405 and pull it down from blocking the open face of the container 120A.

Figure 6:
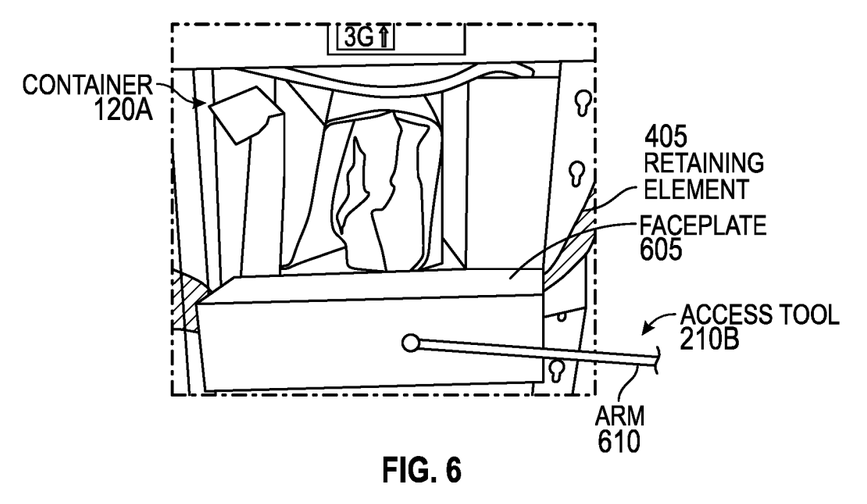
FIG. 6 illustrates an access tool for displacing a retaining element to provide access to a container, according to one embodiment.

FIG. 6 illustrates an access tool 210B for displacing the retaining element 405 to provide access to the container 120A, according to one embodiment. In this example, the access tool 210B includes a faceplate 605 coupled to an arm 610. The arm 610 can move the faceplate 605 in an area above the retaining element 405 and then move the faceplate 605 down to displace the retaining element 405 so that a grabber tool can access the inside of the container. In this embodiment, the faceplate 605 has a L shape so that a top surface of the faceplate 605 contacts the retaining element 405 and stretches the element 405. In other embodiment, the faceplate may have an upside down V shape so that the retaining element 405 is caught in the middle of the faceplate 605 as the arm 610 pulls it down.

Figure 7:
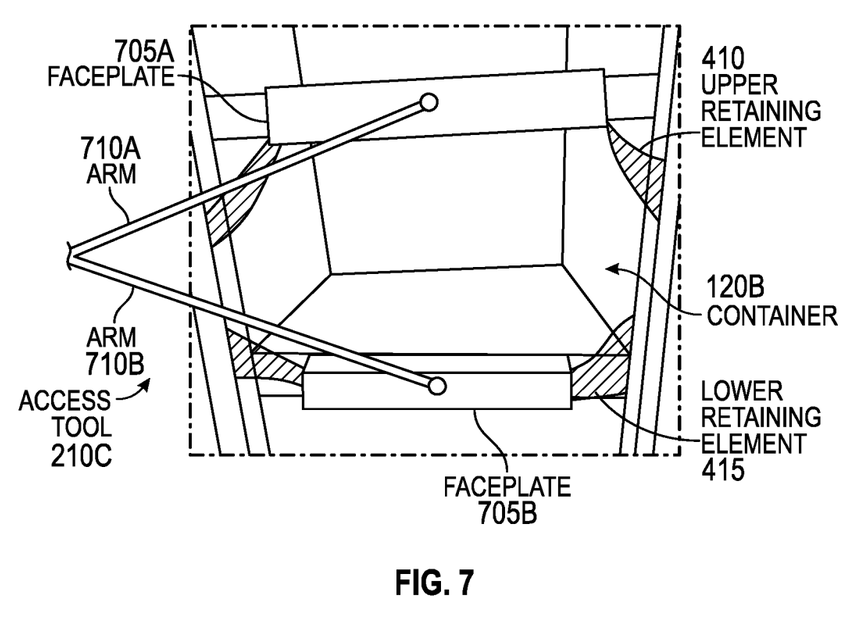
FIG. 7 illustrates an access tool for displacing multiple retaining elements to provide access to a container, according to one embodiment.

FIG. 7 illustrates an access tool 210C for displacing multiple retaining elements to provide access to a container, according to one embodiment. The container 120B in FIG. 7 has both upper retaining element 410 and the lower retaining element 415. To spread these elements 410, 415 apart, the access tool 410C includes two faceplates 705A and 705B that are connected to respective arms 710A and 710B. The access tool 210C may first move the arms so that the faceplates 705 are close together (or touching) and disposed in the middle of the open face of the container 120A. The arms 710 can then move the faceplate 705A up and the faceplate 705B down to spread the retaining elements apart, thereby providing better access to the inside of the container 120B. The faceplates 705 can be L-shaped, V-shaped, or any other shape that can stretch the retaining elements in the desired directions to enable the grabber tool to stow or pick an item.

Figure 8:
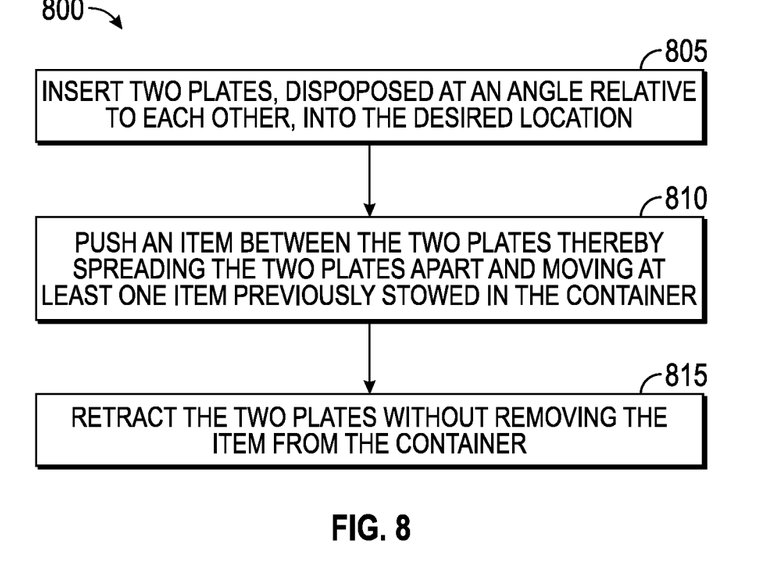
FIG. 8 is a flowchart for using a spacer tool to generate space for stowing an item in a container, according to one embodiment.

FIG. 8 is a flowchart of a method 800 for using a spacer tool to generate space for stowing an item in a container, according to one embodiment. In one embodiment, the method 800 is performed after a retaining element or elements has been displaced. For example, the method 800 is one embodiment of performing block 340 of the method 300.

Figure 9A:
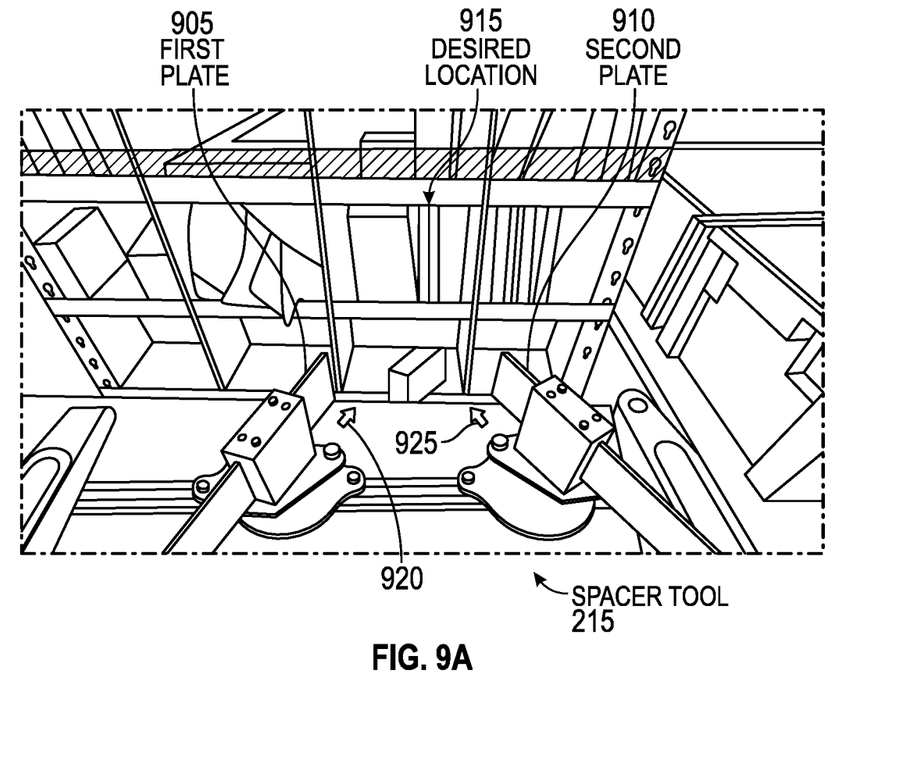
FIGS. 9A-9D illustrate using a spacer tool and a grabber tool to stow an item in a container, according to one embodiment.

For clarity, the block of method 800 are described in parallel with FIGS. 9A-9D which illustrate using a spacer tool and a grabber tool to stow an item in a container, according to one embodiment. At block 805, the spacer tool inserts two plates, disposed at an angle relative to each other, into the desired location to stow an item in the container. As shown in FIG. 9A, the spacer tool 215 includes a first plate 905 and a second plate 910 disposed at angles relative to each other (non-parallel). Further, the plates 905, 910 have non-perpendicular angles relative to the open face of the container where the item is going to be stowed. The plates 905, 910 may be formed from semi-rigid or a flexible material.

The arrow 920 shows moving the first plate 905 in a first, angled direction towards the desired location 915 while the arrow 925 shows moving the second plate 910 in a second, different angled direction towards the desired location 915. That is, the gantry may adjust the position of the spacer tool 215 such that when the first and second plates 905, 910 are extended, they meet at the desired location 915.

In one embodiment, the desired location 915 is between two items. For example, the stow/pick system may identify a location where already stowed items can be compressed to create space for the new item. As shown in FIG. 9A, there is very little, if any, available space in the container. Nevertheless, the system may identify (using the data from the perception system) that one or more of the items in the container is compressible so that additional space can be created. Or the system may determine that there is space (even if the items are not compressible), but in the current arrangement the space is not sufficient for the item. In this case, the system can use the spacer tool 215 to rearrange the items in order to create sufficient space for the item.

Figure 9B:
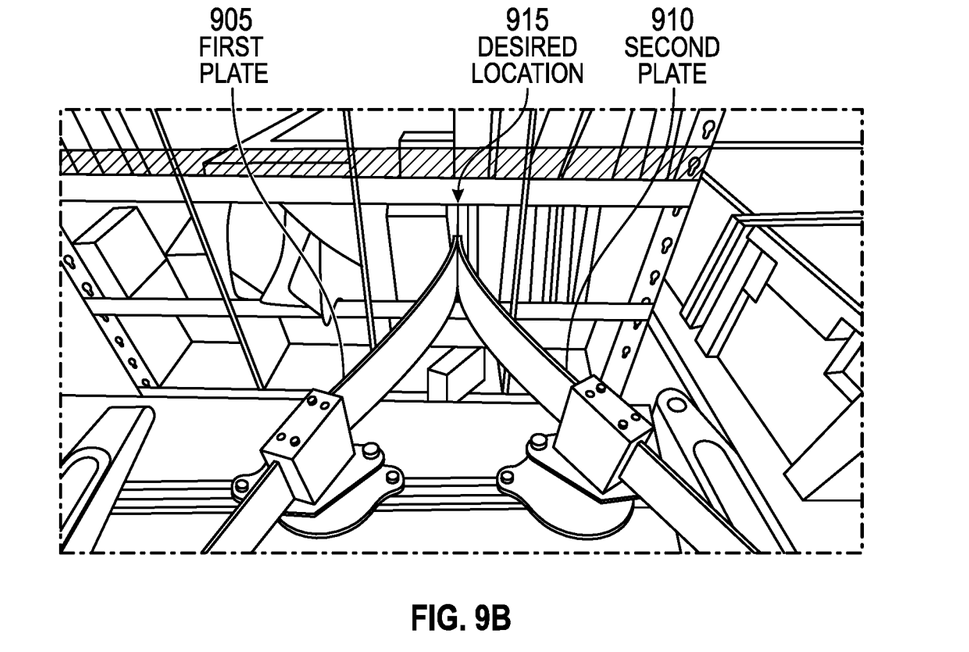

FIG. 9B illustrates the result of inserting the plates 905, 910 into the desired location 915. That is, the plates 905, 910 come into contact with each other and are disposed between two of the items already stowed in the container. As the spacer tool 215 inserts the plates into the desired location 915, the relative angle between the plates creates a space between the plates and the two items.

Figure 9C:
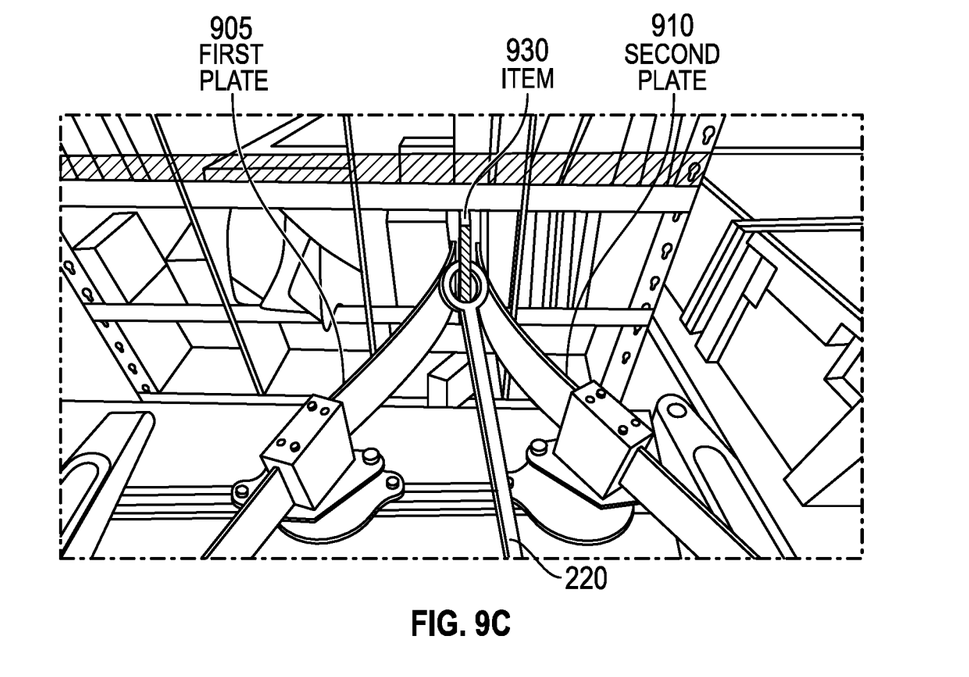

Returning to the method 800, at block 810 the grabber tool pushes an item between the two plates thereby spreading the two plates apart and moving at least one item previously stowed in the container. FIG. 9C illustrates the grabber tool 220 inserting the item 930 between the two plates 905, 910. In one embodiment, the V-shape created by the two plates being inserted into the desired location serves as a guide for the grabber tool 220 to insert the item 930. As the grabber tool 220 pushes the item, this forces the plates 905, 910 further apart, which in turn forces apart the items on the other side of the plates 905, 910. Depending on the type of items and the available space in the container, separating the plate 905, 910 may compress one or more items in the container or change the arrangement of the items.

Figure 9D:
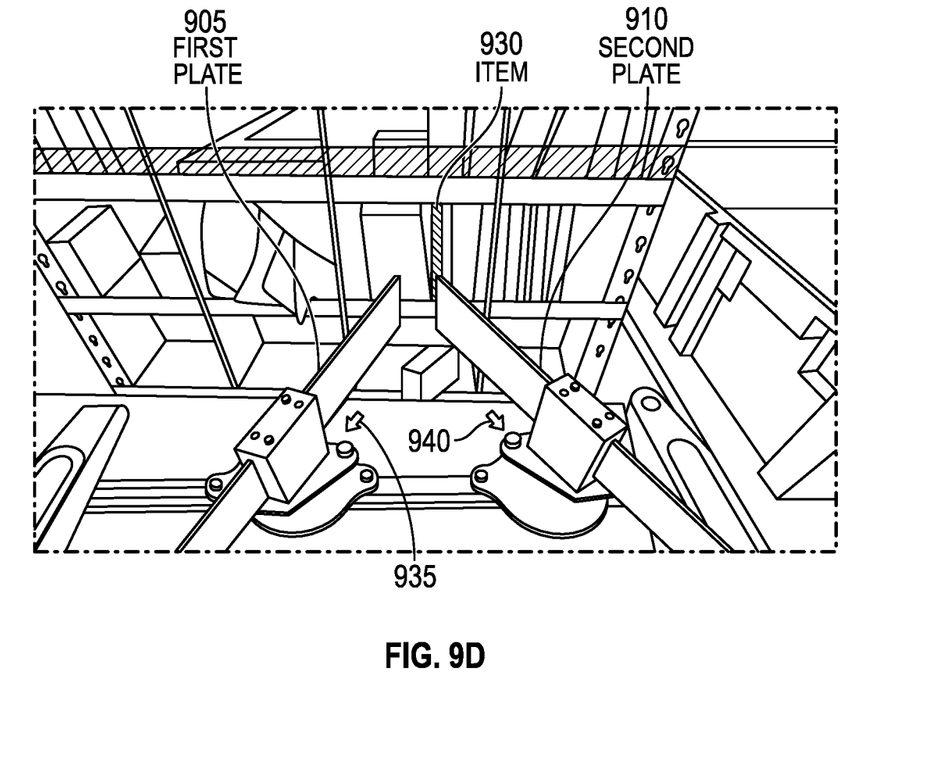

At block 815, the spacer tool retracts the two plates without removing the item from the container. As shown in FIG. 9D, the first and second plates 905, 910 are retracted away from the container as shown by the arrows 935 and 940, but the item 930 remains stowed in the container. In this manner, the space tool 220 can create space between two items so that the grabber tool can stow the item between those items. However, as mentioned above, the spacer tool 215 in FIGS. 9A-9D is just one example of a suitable spacer tool that be used, with other alternatives being described previously.

In alternative embodiment, the spacer tool illustrated in FIGS. 9A-9D can use only one of its plates to create space to insert an item. For example, the spacer tool 215 in FIG. 9A can be aligned such that the first plate 905, when inserted, contacts the rightmost wall of the container. Thus, as the first plate 905 (which might be made from a flexible material) is pushed further into the container, the first plate 905 is inserted between the rightmost wall and the rightmost item in the container.

Because the first plate 905 is angled relative to the rightmost wall, inserting the first plate 905 into the container creates a gap between the first plate 905 and the rightmost wall. Similar to the grabber tool 220 inserting the item 930 between the first and second plates 905, 910 as shown in FIG. 9C, in this embodiment, the grabber tool 220 can insert an item in the gap between the first plate 905 and the rightmost wall. The first plate 905 can then be retracted. In this manner, a new item can be stowed at the rightmost position in the container. The second plate 910 could also be used to insert an item against the leftmost wall of the container. In yet another embodiment, rather than having both plates 905 and 910, the spacer tool 215 can include just one angled plate and use the process above to repeatedly create space at one of the sidewalls of the container for inserting new items.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method, comprising:
    capturing sensor data of a container storing a plurality of items having different shapes and sizes;
    identifying a location in the container to stow a new item based on the sensor data;
    aligning an access tool and a grabber tool with the container;
    displacing an elastic band disposed on an open face of the container using the access tool;
    stowing, after displacing the elastic band, the new item in the location using the grabber tool through the open face; and
    releasing the elastic band.

2. The method of claim 1, wherein the container is disposed on a rack containing a plurality of containers, wherein the method further comprises:
    moving the access tool and the grabber tool to a position in front of the container using at least one of a gantry or robotic arm.

3. The method of claim 2, wherein the sensor data is captured using a perception sensor, wherein the perception sensor is mounted on the at least one gantry or robotic arm.

4. The method of claim 3, wherein the access tool, the grabber tool, and the perception sensor are attached to a mount on the gantry, wherein the gantry is configured to move the mount along at least two axes.

5. The method of claim 2, further comprising:
    moving the rack in a position in front of the at least one of a gantry or robotic arm using a robot.

6. A method, further comprising:
    aligning a mount with a container comprising a plurality of items, wherein a perception sensor and a grabber tool are attached to the mount;
    analyzing an environment in a container based on data captured by the perception sensor;
    identifying a location in the container to stow a new item based on analyzing the environment in the container;
    displacing a retaining element securing the plurality of items in the container using an access tool; and
    stowing the new item at the location using the grabber tool.

7. The method of claim 6, wherein the container is one of a plurality of containers in a rack.

8. The method of claim 7, wherein the mount is attached to a gantry that is configured to move the mount in a 2D area.

9. The method of claim 7, wherein the mount is attached to a robotic arm.

10. The method of claim 6, wherein the access tool is attached to the mount, and wherein displacing the retaining element is performed before stowing the new item.

11. The method of claim 10, wherein the retaining element comprises at least one of an elastic band, a flap, or a gate.

12. The method of claim 6, further comprising, before stowing the new item:

creating space for the new item at the location using a spacer tool, wherein the spacer tool at least one of moves or compresses at least one of the plurality of items.

13. A method, further comprising:
aligning a spacer tool and a perception sensor to a container comprising a plurality of items;
analyzing an environment in a container based on data captured by the perception sensor;
identifying a location in the container to stow a new item based on analyzing the environment in the container;
creating space for the new item at the location using a spacer tool, wherein the spacer tool at least one of moves or compresses at least one of the plurality of items; and
stowing the new item at the location.

14. The method of claim 13, wherein creating the space for the new item comprises:
inserting two plates, disposed at an angle relative to each other, into the container at the location.

15. The method of claim 14, wherein the location is between two of the plurality of items in the container, wherein the two plates contact each other at the location.

16. The method of claim 15, wherein stowing the new item comprises:
pushing the new item between the two plates thereby spreading the two plates and the two of the plurality of items apart.

17. The method of claim 16, wherein stowing the new item comprises:
retracting the two plates without removing the new item.

18. The method of claim 13, wherein the spacer tool and the perception sensor are attached to a same mount.

19. The method of claim 18, wherein stowing the new item is performed using a grabber tool, wherein the grabber tool is attached to the same mount.

20. The method of claim 19, wherein an access tool is attached to the same mount, wherein the method further comprises:
displacing a retaining element securing the plurality of items in the container using the access tool before creating the space for the new item.

* * * * *

UNITED STATES PATENT AND TRADEMARK OFFICE
CERTIFICATE OF CORRECTION

| | |
|---|---|
| PATENT NO. | : 11,912,503 B1 |
| APPLICATION NO. | : 17/037068 |
| DATED | : February 27, 2024 |
| INVENTOR(S) | : Aaron Joseph Parness et al. |

It is certified that error appears in the above-identified patent and that said Letters Patent is hereby corrected as shown below:

In the Claims

Claim 6 at Column 12, Line 43 should read:
-- A method comprising: --.

Claim 13 at Column 13, Line 5 should read:
-- A method comprising: --.

Signed and Sealed this
Fourteenth Day of May, 2024

Katherine Kelly Vidal
*Director of the United States Patent and Trademark Office*